United States Patent
Butler et al.

(10) Patent No.: US 12,056,774 B2
(45) Date of Patent: Aug. 6, 2024

(54) PREDICTING A TIME OF NON-REAL TIME POSTS USING CONTEXTUAL METADATA

(71) Applicant: International Business Machines Corporation, Armonk, NY (US)

(72) Inventors: Christopher Butler, Melbourne (AU); Jennifer Lai, Yorktown Heights, NY (US); Shaila Pervin, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1169 days.

(21) Appl. No.: 15/819,748

(22) Filed: Nov. 21, 2017

(65) Prior Publication Data

US 2019/0156221 A1    May 23, 2019

(51) Int. Cl.
*G06Q 50/00*    (2024.01)
*G06N 5/022*    (2023.01)
*G06V 10/75*    (2022.01)

(52) U.S. Cl.
CPC ............. *G06Q 50/01* (2013.01); *G06N 5/022* (2013.01); *G06V 10/75* (2022.01)

(58) Field of Classification Search
CPC .......... G06N 5/022; G06N 5/04; G06N 5/027; G06Q 50/01
See application file for complete search history.

(56) References Cited

U.S. PATENT DOCUMENTS

| | | | | |
|---|---|---|---|---|
| 8,045,805 B2* | 10/2011 | Ramsay | ................... | G06K 9/00 382/190 |
| 8,799,756 B2* | 8/2014 | Grosz | ................... | G06F 3/1205 715/202 |
| 9,361,941 B2 | 6/2016 | Lection | | |
| 9,369,536 B1 | 6/2016 | Holtzclaw et al. | | |
| 9,710,757 B2 | 7/2017 | Gilon et al. | | |
| 9,720,935 B2* | 8/2017 | Hunt | ................... | G06F 16/5866 |
| 9,747,313 B2 | 8/2017 | Kaufmann et al. | | |
| 9,767,205 B2 | 9/2017 | Yung et al. | | |
| 10,203,933 B2* | 2/2019 | Yang | ................... | G06F 9/453 |
| 11,157,574 B2* | 10/2021 | Li | ................... | G06F 16/287 |
| 2002/0112247 A1 | 8/2002 | Horner et al. | | |
| 2014/0129558 A1* | 5/2014 | Estes | ................... | G06F 16/245 707/737 |

(Continued)

OTHER PUBLICATIONS

Chae, Junghoon, et al. "Spatiotemporal social media analytics for abnormal event detection and examination using seasonal-trend decomposition." 2012 IEEE Conference on Visual Analytics Science and Technology (VAST). IEEE, 2012. (Year: 2012).*

Chen, Siming, Lijing Lin, and Xiaoru Yuan. "Social media visual analytics." Computer Graphics Forum. vol. 36. No. 3. 2017. (Year: 2017).*

Müller, Eric, Matthias Springstein, and Ralph Ewerth. "When was this picture taken?"—Image date estimation in the wild. European Conference on Information Retrieval. Springer, Cham, 2017. (Year: 2017).*

(Continued)

*Primary Examiner* — Ryan C Vaughn
(74) *Attorney, Agent, or Firm* — Geoffrey Pechie

(57) ABSTRACT

A computer-implemented prediction method, system, and computer program product including detecting an anomaly between at least two images in a social media timeline, analyzing at least one of contextual data and image data associated with the at least two images that cause the anomaly, and predicting an actual time of the at least two images in the social media timeline based on the analyzed at least one of contextual data and image data.

16 Claims, 6 Drawing Sheets

(56) References Cited

U.S. PATENT DOCUMENTS

| | | | |
|---|---|---|---|
| 2015/0170294 A1* | 6/2015 | Goyal | G06Q 50/01 705/14.61 |
| 2015/0234862 A1* | 8/2015 | Patil | G06F 16/951 707/706 |
| 2015/0254341 A1 | 9/2015 | Rai et al. | |
| 2016/0104069 A1* | 4/2016 | Garg | H04L 51/12 706/11 |
| 2017/0280090 A1* | 9/2017 | Raskin | H04N 13/261 |
| 2018/0032997 A1* | 2/2018 | Gordon | G06Q 30/0269 |
| 2018/0174190 A1* | 6/2018 | Ferreira | G06Q 50/01 |
| 2018/0285748 A1* | 10/2018 | Husain | G06Q 50/01 |
| 2020/0089812 A1* | 3/2020 | Kline | G06F 16/58 |

OTHER PUBLICATIONS

Dsilva, Carmeline J., et al. "Temporal ordering and registration of images in studies of developmental dynamics." Development 142.9 (2015): 1717-1724. (Year: 2015).*

Xie et al., "Visual Memes in Social Media Tracking Real-World News in YouTube Videos", Nov. 28, 2011, MM '11: Proceedings of the 19th ACM international conference on Multimedia, pp. 53-62. (Year: 2011).*

Misra et al., "Shuffle and Learn: Unsupervised Learning Using Temporal Order Verification", Sep. 17, 2016, ECCV 2016, Part I, LNCS 9905, pp. 527-544. (Year: 2016).*

Mel, et al. "The NIST Definition of Cloud Computing". Recommendations of the National Institute of Standards and Technology. Nov. 16, 2015.

* cited by examiner

PREDICTING A TIME OF NON-REAL TIME POSTS USING CONTEXTUAL METADATA

BACKGROUND

The present invention relates generally to a prediction method, and more particularly, but not by way of limitation, to a cognitive method, a computer program product, and a system to predict a time of non-real time posts using contextual metadata.

Social media is increasingly being used to share newsworthy events, whether local or international. Social media is being mined by intelligence, defense and national safety agencies to determine how and where attention may need to be focused. Social media is also used as a cross-reference tool for multi-sourced analytic applications. As such, it has become important to know an actual time (temporal) of an event mentioned in a post.

However, social media posts can be made in an asynchronous time fashion. For example, a user can post a picture or write about experiences that occurred on a previous trip that took place some time ago. It is not easy to determine the actual time of the event described in the post if the media content does not have actual time information embedded with the post (i.e. if the image is taken as screen-shot from some other image, it would have the time stamp of when the screen shot was taken as its creation time) or the user does not mention the actual timeline along with the post (i.e. if the user says that they had a wonderful time in a natural wilderness, instead of that they had a wonderful time in a natural wilderness on a specific date and time).

Therefore, there is a need in the art for predicting an actual time of the social media posts based on, for example, the contextual metadata.

SUMMARY

In an exemplary embodiment, the present invention provides a computer-implemented prediction method, the method including detecting an anomaly between at least two images in a social media timeline, analyzing one of contextual data and image data associated with the at least two images that cause the anomaly, and predicting an actual time of the at least two images in the social media timeline based on the analyzed contextual data and image data.

One or more other exemplary embodiments include a computer program product and a system.

The above summary will be described in more detail below with reference to the drawings. The invention is capable of embodiments in addition to those described and of being practiced and carried out in various ways. It is thus to be understood that the invention is not limited in its application to the details of construction and to the arrangements of the components set forth in the following description or illustrated in the drawings. Also, it is to be understood that the phraseology and terminology employed herein, as well as the abstract, are for the purpose of description and should not be regarded as limiting.

As such, those skilled in the art will appreciate that the present invention may readily be utilized as a basis for the designing of other structures, methods and systems for carrying out the several purposes of the present invention. It is important, therefore, that the claims appended hereto be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
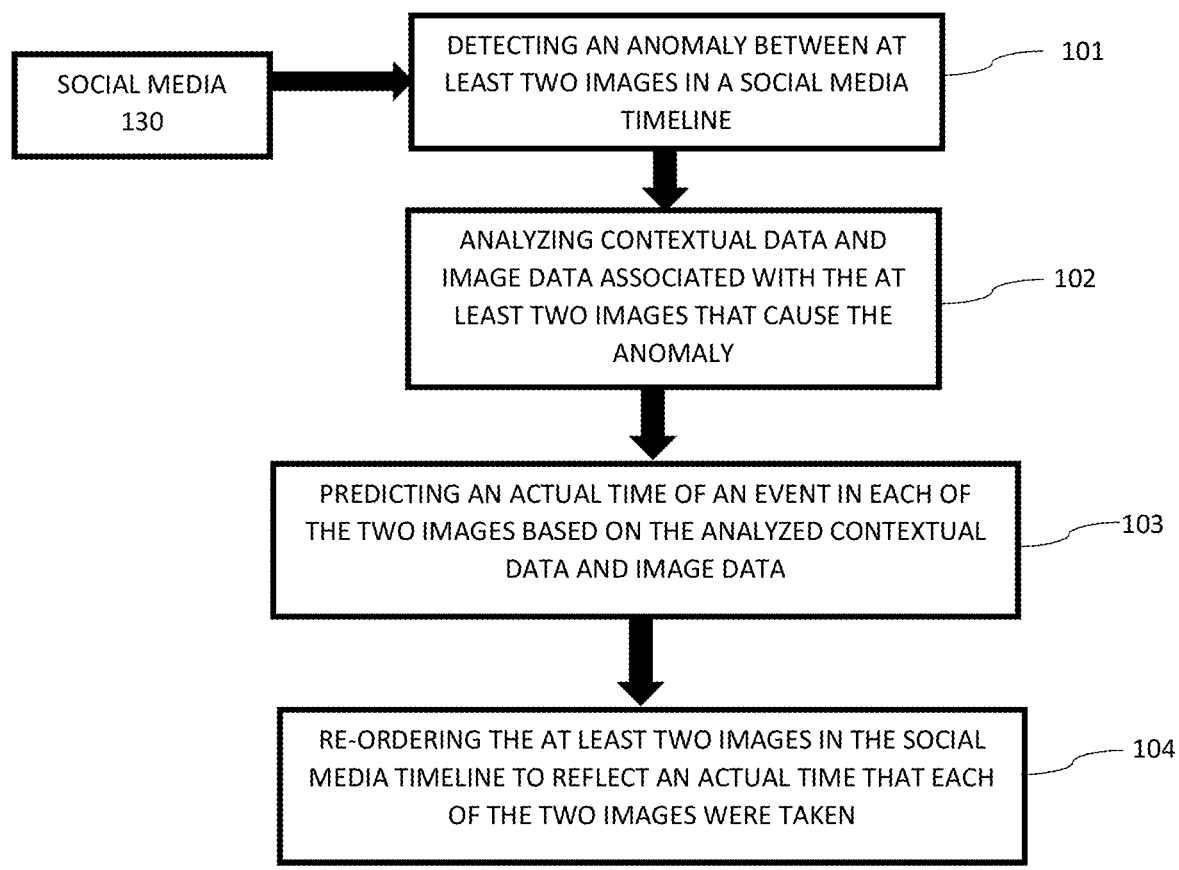
FIG. 1 depicts a high-level flow chart for a computer-implemented prediction method, according to an embodiment of the present invention.

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, a prediction method 100 according to an embodiment of the present invention includes various steps for detecting anomalies between at least two social media posts (e.g., person being in two different countries at the same time) and calculating and predicting a corrected timeline of a post in social media, blog, etc. which has no explicit information of its actual timeline embedded with the social media post using image analytics and contextual metadata. As depicted in FIG. 1, in step 101, social media data 130 is processed and an anomaly is detected between at least two images in a social media timeline. An anomaly includes a social media post of a picture having a poster being in two different locations at a same time. For example, social media sites allow users to post pictures or events in non-real time (i.e., after you return from an activity, trip, etc., a user may upload their experiences to their social media timeline). Thus, a user may be uploading a picture from a trip or event that took place in the past while at the same time uploading a picture in real time (or a non-real time picture from a different time in the past) that indicates an anomaly such as the user being in two different countries at the same time. In one example, the first image of the at least two images can include an image of the user in front of the Golden Gate Bridge with the sun shining in the sky posted minutes before a second image of a user having a coffee at their workplace located in Iowa with the moon in the background out their office window captioned "burning the midnight oil". Clearly, the user cannot be at the Golden Gate Bridge and at their workplace in Iowa at the same time. Or, if the user happened to also work in San Francisco, a user cannot be at the Golden Gate Bridge during the day with the sun out at the same time as they are at work at night with the moon in the sky. Thus, in step 101, an anomaly between the two posts can be detected.

After an anomaly is detected in step 101, in step 102, contextual data and image data associated with the at least two images that caused the anomaly is detected. That is, the method 100 identifies that the user cannot be at the Golden Gate Bridge during the day at the same time that they are drinking coffee at night at their office in Iowa. That is, the temporal aspects of the two images are logically incongruent. Therefore, in step 102, contextual data and image data is analyzed to determine an actual time of when each of the posts (images) occurred. For example, contextual data can be analyzed which includes e-mail, prior posted images, prior captions, comments, calendar data, credit card spending trends (e.g., airline tickets, travel, purchases at or near the location of the image, etc.), prior textual posts, etc.

That is, the user may have in their calendar their trip plans to the Golden Gate Bridge. Or, credit card transaction history showing purchases at shops in San Francisco which can filter a time frame (i.e., a first purchase made at a shop in San Francisco on July 5 and the last purchase made on July 10) can be analyzed. In one embodiment, comments on the images can be analyzed by other users to predict a time frame of the post (e.g., a comment saying "I was also in San Francisco that week!" can cause the method to further look into that other user comment and their travel data to determine a data of the image). Further, metadata of the user's devices can be used to determine a time and location of a user (e.g., Global Positioning Services (GPS) of a smart phone, an internet protocol (IP) address, etc.). Further, image data can also be analyzed to provide temporal aspects of the image (e.g., a poster advertising a concert at the corn palace on Jul. 6, 2017 in Iowa or a one-day sale at a department store "tomorrow, Jul. 9, 2017", etc.)

Image data can also be analyzed to determine an actual time of the post. For example, the sun shining in the Golden Gate Bridge picture can be then correlated with a weather report for the San Francisco area to determine potential days where the sun was shining, and, even more specifically, can process the image to determine a potential time of day based on the height of the sun in the sky in relation to other objects in the image. Similarly, other background data in the image can be analyzed to attempt to determine an actual time of the image. For example, restaurant names in the background can be extracted and then the user's transaction history can be compared to determine if the user made any purchases at the shops. Or, the restaurant names can be tracked to see if the user "checked-in" to any of the locations or had any other similar past posts related to the restaurants. In one embodiments, other users in the images can be extracted and then the other users posts can be compared with the image of the user to determine an actual time of the posting (i.e., a second user is seen in the photo, the second user's profile is extracted and found that this second user posted the images in real-time and thus the user's images can be identified as at the same time). The image data can be analyzed at a granular level such as determining the clothing the user is wearing and seeing if the clothing was recently purchased to limit the period. Or, the user themselves can be analyzed and correlated to other images of the user to attempt to determine a time frame of the post (i.e., a hair style may have only been used by the user for a short time and matching the hair style can help limit the time frame).

It is noted that although the contextual data and image data can be analyzed independently of each other, a combined analysis can be performed using both techniques. In this manner, lesser anomalies can be determined such as a user being in the same location (e.g., their home) but indicators in the image show that the posts can be several months apart (e.g., holiday decorations, seasonal indicators such as snow, leaves on trees, etc. in the background). Therefore, the invention can detect minor anomalies between a same location as well as major anomalies such as completely different countries.

In step 103, an actual time of an event in each of the two images is predicted based on the analyzed contextual data and image data. Thus, even if the picture of the user at the Golden Gate Bridge and the picture of the user in their office are uploaded in non-real time (i.e., not at the time of the actual events), the anomaly between the two posts indicates that the two posts are from different times, and based on the contextual data and image data, an actual time of each of the posts can be identified (e.g., July 5-10 for the Golden Gate Bridge and the prior evening (August 5) for the work picture).

Figure 3:
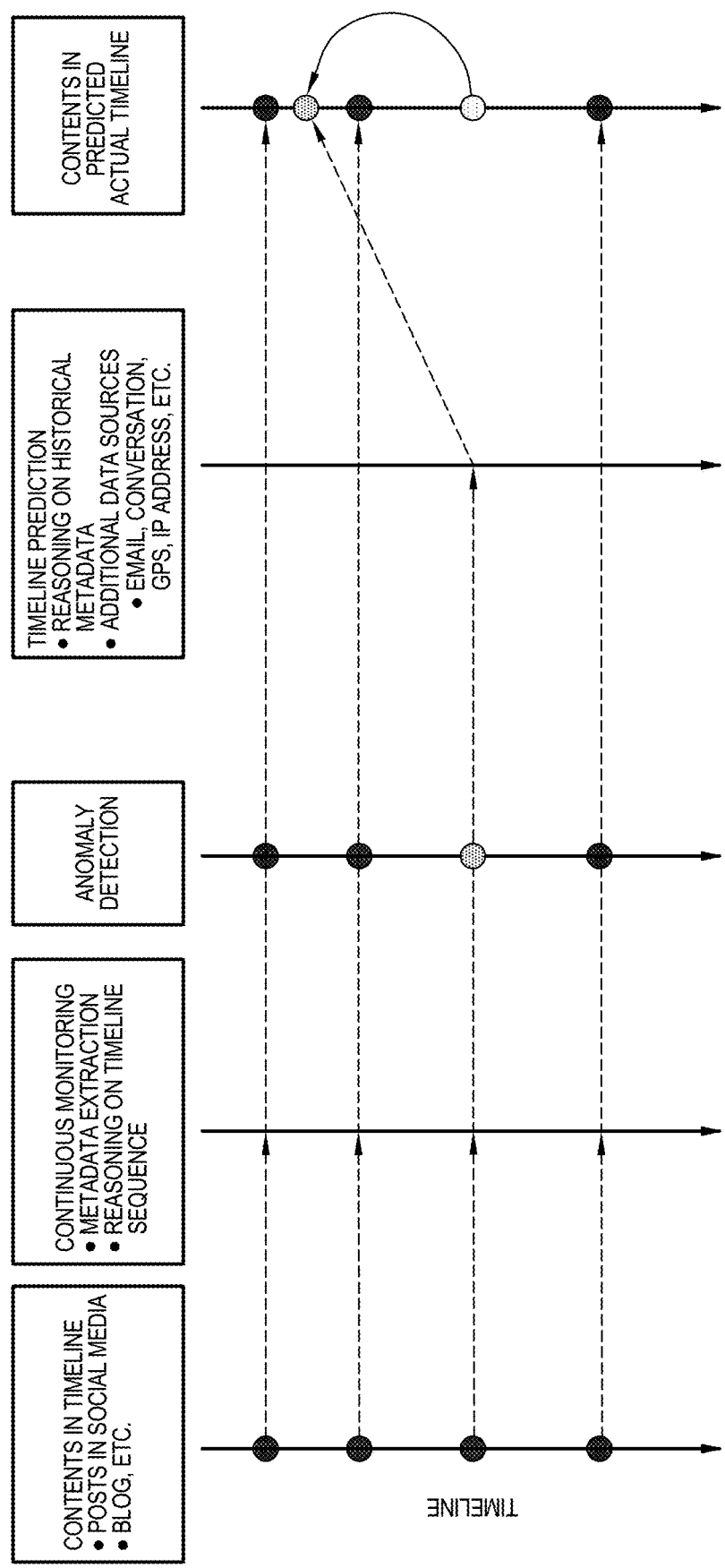
FIG. 3 exemplarily depicts a second embodiment of the computer-implemented prediction method 100 re-ordering the at least two images.

In step 104, the at least two images in the social media timeline are re-ordered to reflect an actual time that each of the two images was taken. Therefore, the dates associated with each of the images/posts are modified to show an actual time that the images/events took place. For example, as depicted in FIG. 3, the post is re-ordered to be positioned prior to the second post (i.e., the post that indicated the anomaly) in the timeline on the social media platform.

Figure 2:
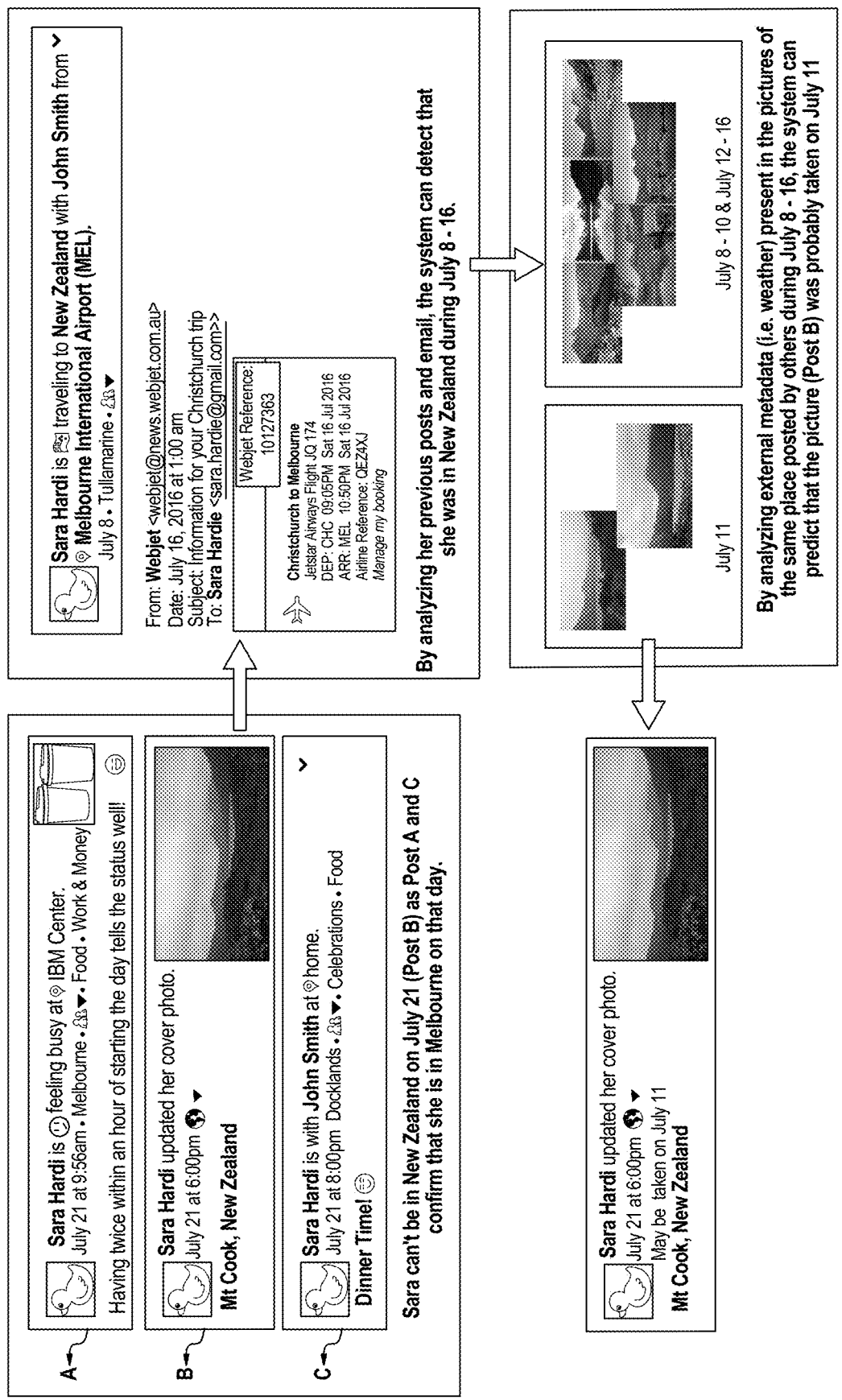
FIG. 2 exemplarily depicts a first embodiment of the computer-implemented prediction method according to a second embodiment of the present invention.

FIG. 2 exemplarily depicts an embodiment of the invention. As shown, a user posts on social media a picture of having coffee at her workplace in Melbourne on July 21 in the morning. That evening on the same day, the user posts a picture of Mount Cook in New Zealand. The user then posts about having dinner at home in Docklands (near Melbourne) again on the same day at night. The user logistically (and logically) cannot be in New Zealand and in Melbourne on the evening of the same day. Thus, in step 101, an anomaly is detected and analysis is performed in step 102 to determine an actual time that post of New Zealand was made. In step 102, the method analyzes her previous posts related to New Zealand and also her email to look for the associated itinerary. The method then predicts (e.g., in step 103, based on the contextual data and the image data, that she was in New Zealand for July 8-16. On a more granular level, method can perform further analysis to limit the period by finding and analyzing pictures of Mt. Cook for the time of July 8-16. The method then compares all pictures of Mt Cook retrieved examining the metadata and doing image analytics. It detects cloudy weather on July 11th and sees cloudy weather with Mt. Cook on the image that the user posted. The method predicts that the picture of Mt. Cook posted by the user was from July 8-16th and most likely from July 11. As a result, the social media time line of the user is re-ordered to show the pictures of Mt. Cook on the timeline between July 8 and 16 and more granularly selects/reorders to July $11^{th}$ based on all the presently-analyzed data.

A prediction method 100 according to some embodiments of the present invention may act in a more sophisticated and useful fashion, and in a cognitive manner while giving the impression of cognitive mental abilities and processes related to knowledge, attention, memory, judgment and evaluation, reasoning, and advanced computation. For example, a system/method may be considered "cognitive" if it possesses macro-scale properties—perception, goal-oriented behavior, learning/memory and action—that characterize systems (i.e., humans) that are generally agreed as cognitive.

Figure 4:
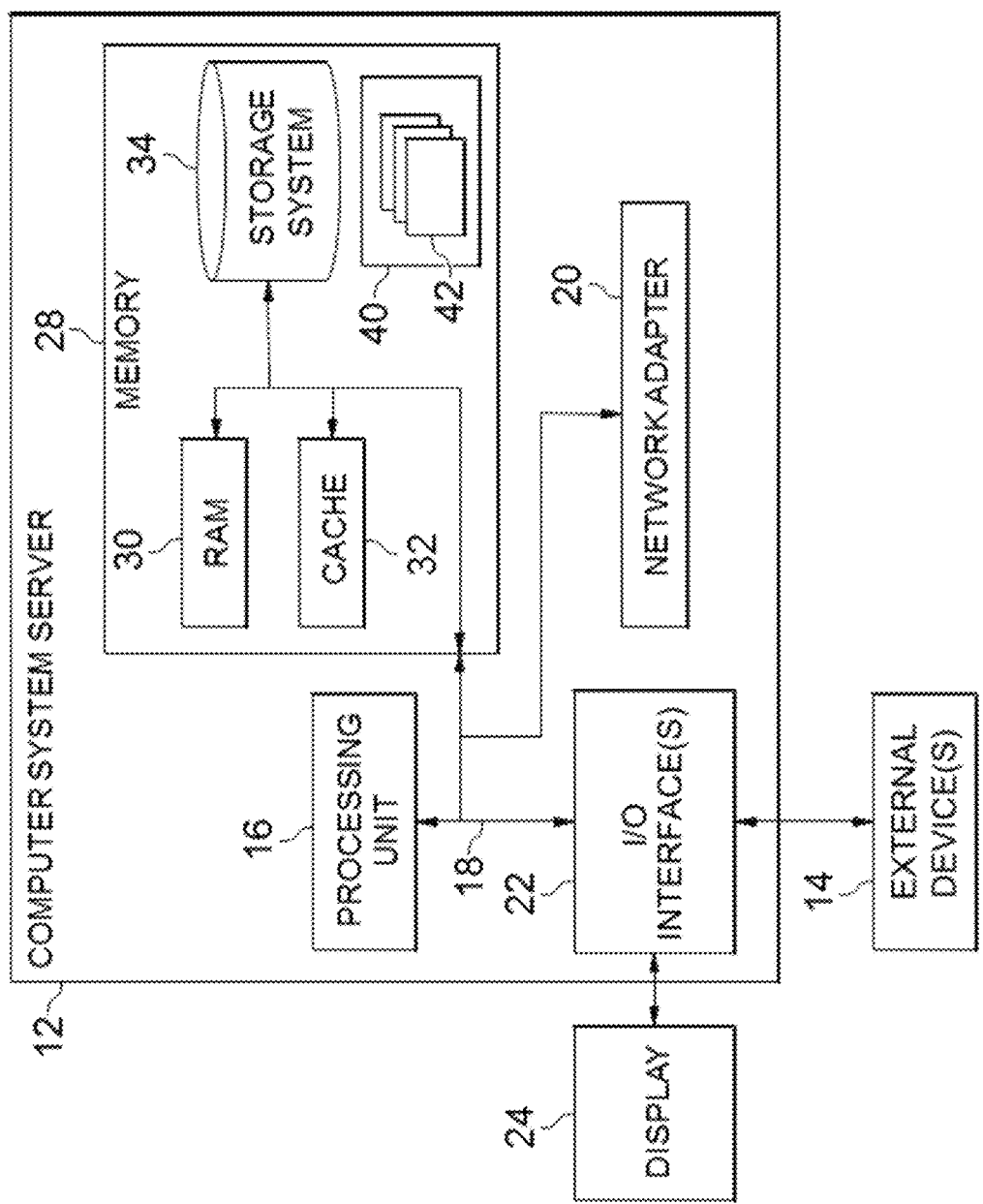
FIG. 4 depicts a cloud computing node according to an embodiment of the present invention.

Referring also now to FIG. 4, one or more computers of a computer system 12 according to an embodiment of the present invention can include a memory 28 having instructions stored in a storage system to perform the steps of FIG. 1.

As will be described/illustrated in more detail below, one or more embodiments of the present invention may be implemented in a cloud environment (see e.g., FIGS. 4-6). It is nonetheless understood that the present invention can be implemented outside of the cloud environment.

Exemplary Hardware Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 4 depicts an example of a computing node in accordance with the present invention. Although computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer server 12 is only one example of a suitable computing node and is not intended to suggest any limitation as to the scope of use or functionality of embodiments of the invention described herein. Regardless, computer server 12 is capable of being implemented and/or performing any of the functionality set forth herein.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in cloud computing environments (see e.g., FIG. 3) where tasks are performed by remote processing circuits that are linked through a communications network. In a distributed cloud computing environment, program modules may be located in both local and remote computer system storage media including memory storage circuits.

Referring again to FIG. 4, computer system/server 12 is shown in the form of a general-purpose computing circuit. The components of computer system/server 12 may include, but are not limited to, one or more processors or processing units 16, a system memory 28, and a bus 18 that operably couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 generally carry out the functions and/or methodologies of embodiments of the invention as described herein.

Computer system/server 12 may also communicate with one or more external devices 14 such as a keyboard, a pointing circuit, a display 24, a camera, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
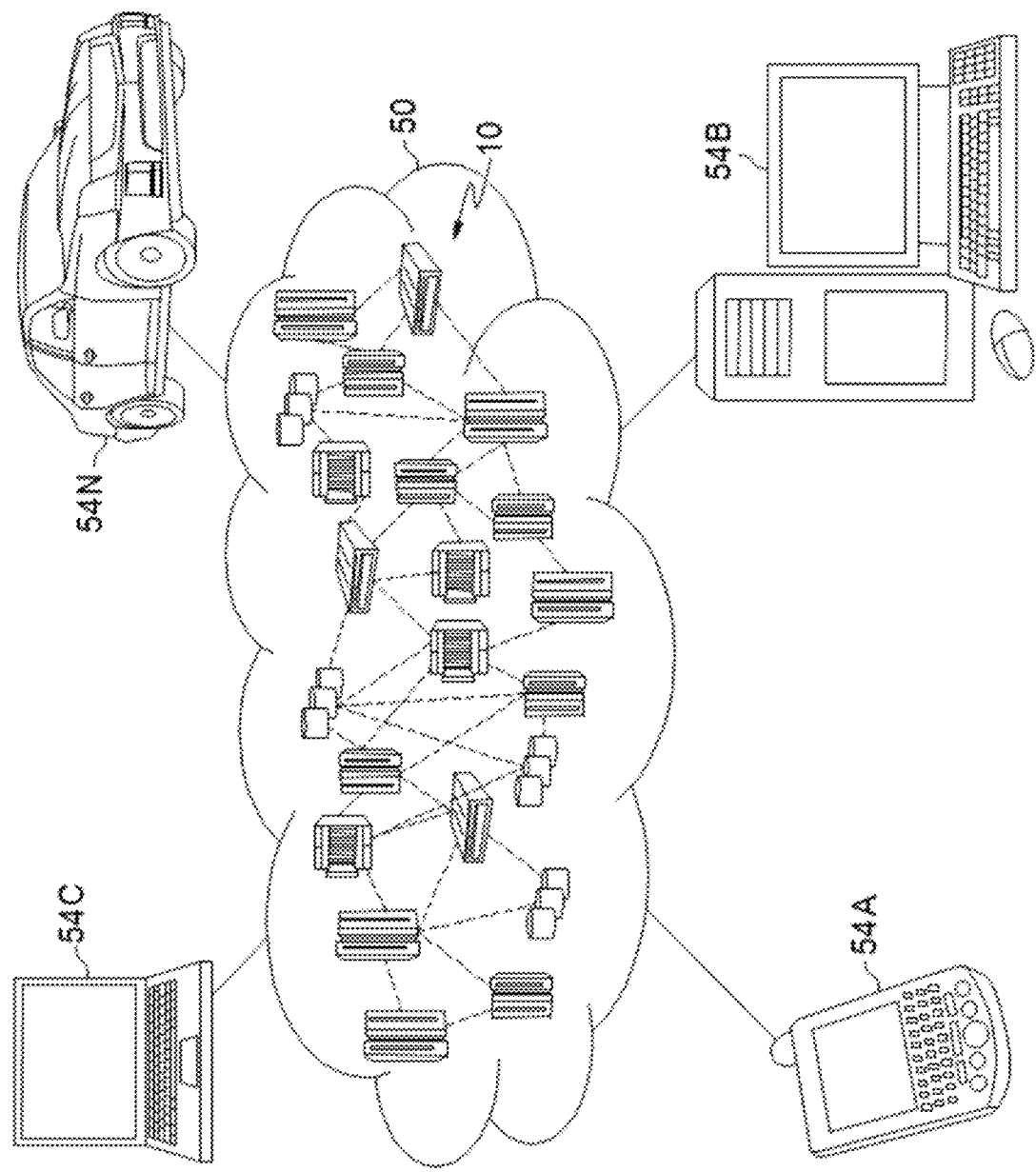
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 (e.g., computer system 12 (FIG. 3) with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
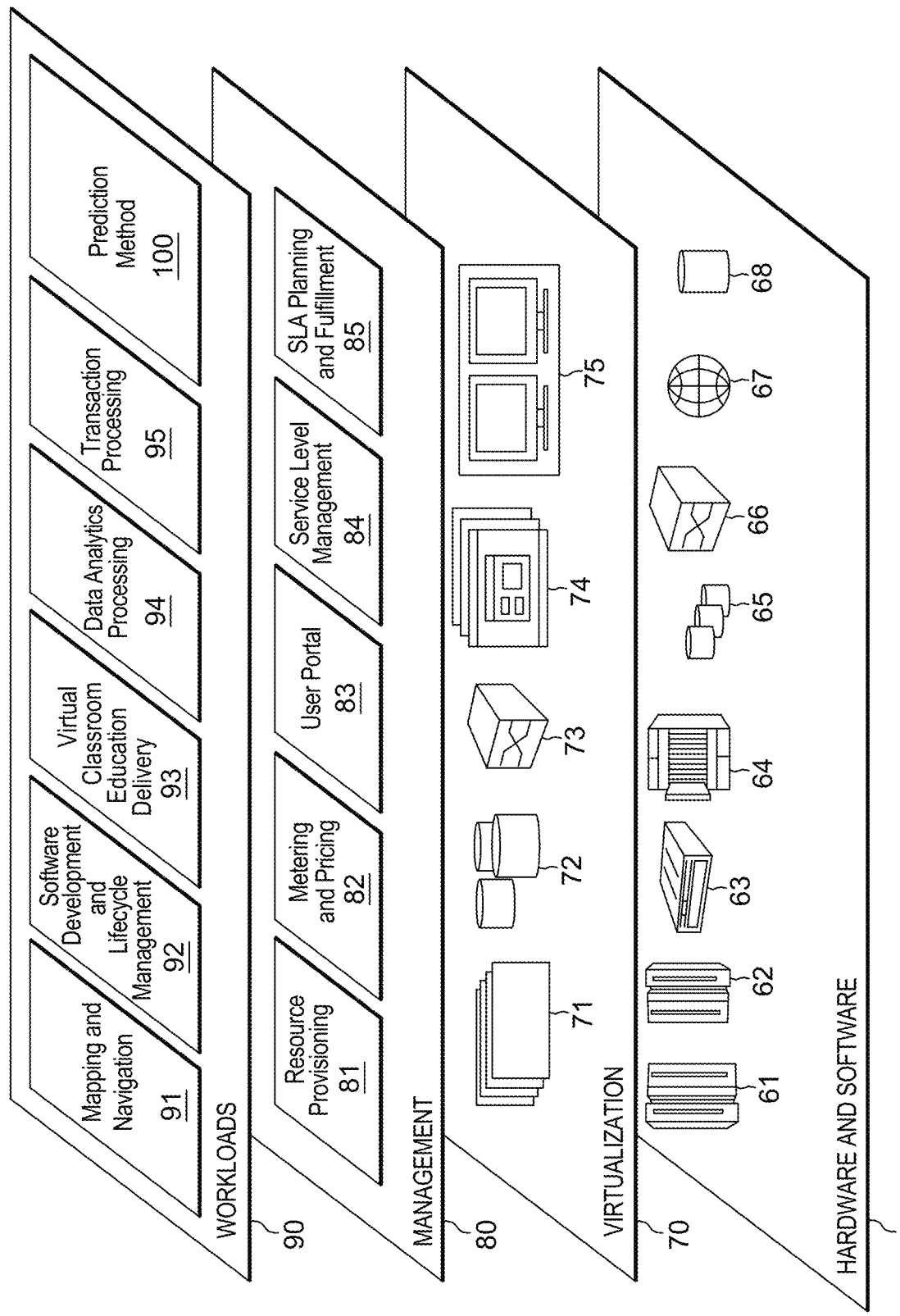
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the prediction method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented prediction method, the method comprising:
    detecting an anomaly, with respect to time, of content between at least two images in a social media timeline based on a user uploading a first image having content that took place at a time different than a current time and a second image that the user is uploading in real-time that indicates the anomaly between the first image and the second image such that temporal aspects of the first image and the second image are logically incongruent, wherein the anomaly includes the first image and the second image having the user being in two different locations at a same time, wherein the detecting the anomaly bases the anomaly on temporal aspects of the content within the two images being logically incongruent when compared to a post time in the social media timeline;
    analyzing at least one of contextual data and image data including the content associated with the at least two images that cause the anomaly;
    predicting an actual time of the at least two images in the social media timeline based on the analyzed at least one of the contextual data and image data; and
    re-ordering the at least two images chronologically based on a result of the predicting.

2. The computer-implemented prediction method of claim 1, wherein the at least two images comprise images from non-real time posts.

3. The computer-implemented prediction method of claim 1, wherein the anomaly is based on an indication that the at least two images are out of temporal order.

4. The computer-implemented prediction method of claim 1, wherein the anomaly is based on an indication that the at least two images are taken at a different time.

5. The computer-implemented prediction method of claim 1, wherein the actual time predicted includes a period of time and a specific time.

6. The computer-implemented prediction method of claim 1, wherein a type of the contextual data is selected from a group consisting of:
    an e-mail,
    a prior posted image,
    a prior caption,
    a user comment;
    an other user comment;
    calendar data;
    a financial transaction history;
    a travel history;
    Global Positioning System (GPS) of a smart phone;
    an internet Protocol (IP) address; and
    a prior textual post, and
wherein a type of the image data is selected from a group consisting of:
    facial recognition;
    object recognition; and
    background image data recognition.

7. The computer-implemented prediction method of claim 1, wherein the predicting predicts the actual time of an event based on both of the image data and the contextual data.

8. The computer-implemented prediction method of claim 1, embodied in a cloud-computing environment.

9. A computer program product, the computer program product comprising a computer readable storage medium having program instructions embodied therewith, the program instructions executable by a computer to cause the computer to perform:
    detecting an anomaly, with respect to time, of content between at least two images in a social media timeline based on a user uploading a first image having content that took place at a time different than a current time and a second image that the user is uploading in real-time that indicates the anomaly between the first image and the second image such that temporal aspects of the first image and the second image are logically incongruent, wherein the anomaly includes the first image and the second image having the user being in two different locations at a same time, wherein the detecting the anomaly bases the anomaly on temporal aspects of the content within the two images being logically incongruent when compared to a post time in the social media timeline;
    analyzing at least one of contextual data and image data including the content associated with the at least two images that cause the anomaly;
    predicting an actual time of the at least two images in the social media timeline based on the analyzed at least one of the contextual data and image data; and
    re-ordering the at least two images chronologically based on a result of the predicting.

10. The computer program product of claim 9, wherein the at least two images comprise images from non-real time posts.

11. The computer program product of claim 9, wherein the anomaly is based on an indication that the at least two images are out of temporal order.

12. The computer program product of claim 9, wherein the anomaly is based on an indication that the at least two images are taken at a different time.

13. The computer program product of claim 9, wherein the actual time predicted includes a period of time and a specific time.

14. A prediction system, the system comprising:
- a processor; and
- a memory operably coupled to the processor, the memory storing instructions to cause the processor to perform:
  - detecting an anomaly, with respect to time, of content between at least two images in a social media timeline based on a user uploading a first image having content that took place at a time different than a current time and a second image that the user is uploading in real-time that indicates the anomaly between the first image and the second image such that temporal aspects of the first image and the second image are logically incongruent, wherein the anomaly includes the first image and the second image having the user being in two different locations at a same time, wherein the detecting the anomaly bases the anomaly on temporal aspects of the content within the two images being logically incongruent when compared to a post time in the social media timeline;
  - analyzing at least one of contextual data and image data associated with the at least two images that cause the anomaly; and
  - predicting an actual time of the at least two images in the social media timeline based on the analyzed at least one of contextual data and image data.

15. The system of claim 14, wherein the at least two images comprise images from non-real time posts.

16. The system of claim 14, embodied in a cloud-computing environment.

* * * * *